(12) United States Patent
Suzaki et al.

(10) Patent No.: US 7,029,117 B2
(45) Date of Patent: Apr. 18, 2006

(54) CONTACT LENS AND CONTACT LENS DESIGN METHOD

(75) Inventors: Asaki Suzaki, Kasugai (JP); Atsushi Kobayashi, Seto (JP)

(73) Assignee: Menicon Co., Ltd., Nagoya (JP)

(*) Notice: Subject to any disclaimer, the term of this patent is extended or adjusted under 35 U.S.C. 154(b) by 0 days.

(21) Appl. No.: 10/339,863

(22) Filed: Jan. 10, 2003

(65) Prior Publication Data
US 2003/0137635 A1    Jul. 24, 2003

(30) Foreign Application Priority Data
Jan. 23, 2002    (JP)    ............... 2002-013747

(51) Int. Cl.
G02C 7/04    (2006.01)
(52) U.S. Cl. .............. 351/160 R; 351/160 H; 351/159
(58) Field of Classification Search ........... 351/160 R, 351/159, 161–162, 160 H
See application file for complete search history.

(56) References Cited

U.S. PATENT DOCUMENTS

| 5,050,981 A |   | 9/1991 | Roffman ............... 351/177 |
| 6,082,856 A | * | 7/2000 | Dunn et al. ............. 351/160 H |
| 6,089,711 A | * | 7/2000 | Blankenbecler et al. 351/160 R |
| 6,244,709 B1 |   | 6/2001 | Vayntraub et al. ......... 351/161 |
| 6,609,793 B1 | * | 8/2003 | Norrby et al. ............ 351/212 |
| 2003/0063254 A1 | * | 4/2003 | Piers et al. ............... 351/159 |

FOREIGN PATENT DOCUMENTS

| EP | 0 560 999 A1 | 9/1993 |
| EP | 0 618 474 A1 | 10/1994 |
| EP | 0 745 876 A2 | 12/1996 |
| EP | 0 949 528 A2 | 10/1999 |
| EP | 0 982 618 A1 | 3/2000 |
| JP | 2859092 | 12/1998 |
| JP | 2913191 | 4/1999 |
| JP | 3022640 | 1/2000 |
| WO | WO94/10599 | 5/1994 |

OTHER PUBLICATIONS

International Search Report, dated Dec. 21, 2004.

* cited by examiner

*Primary Examiner*—Jordan M. Schwartz
*Assistant Examiner*—Jessica Stultz
(74) *Attorney, Agent, or Firm*—Beyer Weaver & Thomas LLP

(57) ABSTRACT

Disclosed is a contact lens having a refractive power ranging from −15.0 to +15.0 diopters in an optical zone thereof, wherein a back optical zone is a conical surface having a conic coefficient ranting from −0.04 to −0.49, and a front optical zone is a conical surface having a conic coefficient ranging from −0.02 to −0.50. The contact lens exhibits optical characteristics required in consideration of an optical system of an eye when being positioned at a position of rest during wear in which an optical axis of the optical zone is decentered with respect to an optical axis of the eye.

8 Claims, 5 Drawing Sheets

The lens is designed based on optical characteristics evaluated in the air.

The optical characteristics of the eye optical system does not conform to that of the lens unit.

(IMPROVEMENTS)

PRESENT INVENTION (AXES DECENTRATION)

(AXES DECENTRATION)

PRESENT INVENTION
(REFRACTIVE POWER = -10D, INTERSECT ANGLE = 0°)

PRESENT INVENTION
(REFRACTIVE POWER = -10D, INTERSECT ANGLE = 10°)

COMPARATIVE EXAMPLE
(REFRACTIVE POWER = -10D, INTERSECT ANGLE = 0°)

COMPARATIVE EXAMPLE
(REFRACTIVE POWER = -10D, INTERSECT ANGLE = 10°)

CONTACT LENS AND CONTACT LENS DESIGN METHOD

INCORPORATED BY REFERENCE

The disclosure of Japanese Patent Application No. 2002-013747 filed on Jan. 23, 2002 including the specification, drawings and abstract is incorporated herein by reference in its entirety.

BACKGROUND OF THE INVENTION

1. Field of the Invention

The present invention relates generally to contact lenses, more particularly to a contact lens of novel structure which during wear on a cornea of an eye is capable of minimizing noticeable change upon decentering of an optical axis of an optical zone of the contact lens with respect to an optical axis of the eye, and to techniques related to such a contact lens.

2. Description of the Related Art

Conventionally, soft contact lenses and hard contact lenses (hereinafter referred to collectively as "contact lenses") such as those disclosed in Japanese Patent Nos. 2,859,092 and 2,913,191, were generally designed with only a lens unit taken into consideration, like in optical lenses for use in other optical devices, such as cameras. Namely, the contact lenses were generally designed by shaping the lens surface according to a ray tracing method so as to achieve a desired refractive power through space. However, a contact lens is worn on a cornea of an eye, and it is therefore no longer possible to ignore factors such as the optical system of the eye per se, the lens effect resulting from a tear fluid layer formed between the contact lens and the cornea during wear (tear-fluid lens effect) and the like. For this reason, the limits of the above-described optical design based on only the contact lens unit have been pointed out, recently. A method for addressing this problem is proposed in Japanese Patent No. 3,022,640, in which a mathematical model of a system composed of a human eye and a preliminary lens is created, and the optical system of the eye is considered using this mathematical model, to thereby minimize aberration so as to give a lens surface shape with improved optical characteristics.

However, regardless of whether the optical system of the eye is considered or not, the conventional contact lens design methods disclosed in Japanese Patent Nos. 2,859,092, 2,913,191 and 3,022,640 are simply desired to optimizing optical characteristics on the optical axis of the contact lens. In this respect, an extensive research conducted by the inventors, as well as numerous clinical trials and studies based thereon have revealed that the presumption in lens design that emphasizes optical characteristics on the optical axis of the contact lens is in itself highly problematic, and that contact lenses deemed optimal under conventional contact lens design methods may practically fail to provide optimal correction of vision of lens wearers.

The principal reasons way optimizing optical characteristics on the optical axis of the contact lens (i.e., an optical center axis of an optical zone of the contact lens, hereinafter referred to as a "lens optical axis") does not necessarily optimally correct vision during contact lens wear, are given in (1)–(3) hereinbelow:

(1) Firstly, a contact lens worn on a cornea is normally tends to come to rest at the ear-side lower portion of the cornea due to effects of gravity, pulling pressure between a tear fluid and the lens, a nonuniform surface curvature of the cornea, and the like. As a result, the contact lens is worn on the cornea in a position in which the lens optical axis of the contact lens, which is set to a geometric center axis of the contact lens, is offset from an optical axis passing through the pupil (hereinafter referred to as a "pupil centerline").

(2) Secondly, a contact lens is designed to move appropriately over the cornea during blinking for the purpose of tear fluid exchange and the like, and accordingly the lens optical axis is not maintained in alignment with the pupil centerline during such frequent movements.

(3) Thirdly, human vision is affected significantly not only by acuity at the fixation point on the pupil centerline, but also by acuity at peripheral locations further away from the pupil centerline (hereinafter referred to as a "peripheral vision"). Therefore, corneal corrective surgery performed with the object of eliminating image aberration on the pupil centerline, for example, may possibly causes aberration further away from the pupil centerline, which conversely increases due to lack of aberration on the pupil centerline, resulting in adverse effects such as poor vision and headache.

In recent years, on the other hand, there has also been proposed to give an a spherical shape to back surfaces of contact lenses, for the purpose of having the shape of the back surface of the contact lens conform to the shape of the cornea, as well as providing appropriate exchange of tear fluid so as to improve contact lens wear comfort. Extensive studies of aspheric lenses of this kind by the present inventors has revealed that when a lens front surface is designed using conventional lens design methods that optimize optical characteristics on the lens optical axis as described above, aberration in a visual field further away from the lens optical axis tends to increase more. Accordingly, where contact lenses typically come to rest at positions with the lens optical axes offset from the pupil centerlines as described above, lenses that have been designed optimally according to conventional lens design methods tend to produce problems such as significantly impaired vision in the course of actual wear.

SUMMARY OF THE INVENTION

It is therefore one object of this invention to provide a contact lens of novel structure that is capable of ensuring an excellent wear comfort through a lens back surface of aspheric shape designed considering a shape of a cornea, and that is also capable of exhibiting excellent optical characteristics even when the pupil centerline is decentered with respect to the lens optical axis, thereby ensuring consistently good vision.

It is another object of this invention to provide a novel design method for producing such a contact lens.

It is a further object of the invention to provide a design family of contact lenses including a plurality of series of contact lens combinations. The contact lenses is novel in structure and capable of ensuring an exceptional wear comfort through a lens back surface of aspheric shape designed considering the shape of the cornea and capable of exhibiting excellent optical characteristics even when the pupil centerline is decentered with respect to the lens optical axis for ensuring consistently good vision. Such contact lenses are combined in series so as to be provided appropriately to consumers requiring those contact lenses.

The above and/or other objects may be attained according to at least one of the following aspects of the invention. The following preferred forms of the respective aspects of the invention may be adopted at any possible optional combinations. It is to be understood that the present invention is not limited to the following forms or combinations of these forms, but may otherwise be recognized based on the thought of the present invention that described in the whole specification and drawings or that may be recognized by those skilled in the art in the light of the disclosure in the whole specification and drawings.

A first mode of the present invention as it relates to a contact lens provides a contact lens having a refractive power ranging from −15.0 to +15.0 diopters in an optical zone thereof, wherein a back surface of the optical zone is a conical surface having a conic coefficient ranging from −0.04 to −0.49, and a front surface of the optical zone is a conical surface having a conic coefficient ranging from −0.02 to −0.50 so that the contact lens provides optical characteristics required in consideration of an optical system of an eye when being located at a position of rest during wear in which an optical axis of the optical zone is decentered with respect to an optical axis of the eye.

The contact lens designed with a structure according to this mode of the invention, is provided with the aspheric back surface of the optical zone, thereby reducing or eliminating localized compression of the cornea, as well as permitting appropriate movement of the contact lens over the cornea, thus advantageously providing oxygen to the cornea through tear fluid exchange, thereby providing superior wear comfort. Also, the contact lens of this mode of the invention is further provided with the aspheric front surface of the optical zone, thereby ensuring consistently good vision with ease, even if the pupil centerline is decentered with respect to the lens optical axis or the pupil centerline is changed displaced relative to the lens optical axis.

Namely, the contact lens designed with a structure according to this mode of the invention employs a combination of the lens back surface that is the conical surface having an optical zone conic coefficient of −0.04 to −0.49, and a lens front surface that is a conical surface having a conic coefficient of −0.02 to −0.50, whereby good wear comfort as well as excellent vision may be achieved simultaneously. In particular, the contact lens of this mode of the invention affords a desired lens shape that makes it possible to achieve required optical characteristics determined taken into account estimated decentration of the lens optical axis and the pupil centerline during wear, and the optical system of the eye.

A diopter range of −15.0 to +15.0 for refractive power in the optical zone in this embodiment is selected because this refractive power range is a practical range typically required in actual practice, and also because outside of this range, particularly where lens optical power is further to the minus side of −15.0 diopters, an effect of an radius of curvature of the back surface of the lens may be too great, making it difficult to achieve good optical characteristics. A range of −0.04 to −0.49 for the conic coefficient of the conical surface forming the back surface of the optical zone is selected because an ability of the back surface of the optical zone to conform to a shape of a cornea of a typical human eye declines outside of this range, resulting in undesirably creating localized compression of the cornea in its center and peripheral zone, and possibly resulting in inadequate tear fluid exchange. A more preferred range for conic coefficient of the conical surface forming the back surface of the optical zone is −0.09 to −0.36. A range of 0.02 to −0.50 for the conic coefficient of the conical surface forming the front surface of the optical zone is selected because outside of this range, it is difficult for the front surface of the optical zone, in combination with the above-described specific back surface of the optical zone, to permit the contact lens during wear to provide the best optical characteristics in terms of stable vision performance and acuity.

The contact lens designed with a structure according to this mode of the invention, preferably have a conical surface on the back surface of the optical zone whose conic coefficient is −0.09 to −0.36. This arrangement permits the back surface of the contact lens to conform to the shape of the cornea of the typical human eye with more accuracy, further effectively establishing both eliminating the localized compression of the cornea and allowing suitable tear fluid exchange.

Still more preferably, the contact lens according to the present mode of the invention has a conic coefficient of the conical surface on the front surface of the optical zone that is 0.4 to 1.6 times the conic coefficient of the conical surface on the back surface of the optical zone. This arrangement permits the contact lens to achieve both good wear comfort and the required optical characteristics within the normal predicted range of decentration occurring in the typical human eye during contact lens wear. As the basis for the typical human eye, one may select, for example, Gullstrand Scuedutic eyes known in the art. The position of the rest of the contact lens is predicted where the back surface of the contact lens selected is round conical surface having a radius of curvature of 6.0 to 9.0 mm at the vertex, and deviation in the intersect angle of the contact lens optical axis and pupil centerline of 5 to 10° during wear.

The required optical characteristics achieved through a contact lens according to this embodiment are preferably optimized within their measured or calculated ranges. Optical characteristics of the contact lens, for example, are evaluated while taking into account the morphology, structure and refractive index of the optical system of the wearer's eye as well as the shape and the refractive index of the contact lens, on the basis of quantitative analysis using wavefront aberration and numerical values calculated for PSF (Point Spread Function), MTF (Modulation Transfer Function), resolving power or the like. By "optical axis of the eye" is meant a variety of so-called eye axes including a vision axis, an optical axis, a pupil center line, gaze line, and a line of sight, which may function as a reference in the optical system of the wearer's eye. That is, while the visual axis referred to as the "line of vision" defines a point of fixed vision, objective measurement of vision axis is not typically possible. This allows one to select another axis, e.g., the pupil centerline as the "optical axis of the eye", since the pupil centerline is easily measured objectively.

A second mode of the present invention as it relates to a contact lens provides a contact lens having a refractive power ranging from −15.0 to +15.0 diopters in an optical zone thereof, wherein a back surface of the optical zone is a conical surface having a conic coefficient ranging from −0.04 to −0.49, and a front surface of the optical zone is a conical surface having a conic coefficient ranging from −0.04 to −0.20 so that the contact lens provides optical characteristics required in consideration of an optical system of an eye when being located at a position of rest during wear in which an optical axis of the optical zone is decentered by 5 to 10° with respect to an optical axis of the eye.

In the contact lens designed with a structure according to this mode of the invention, an appropriately narrowed range for adjusting conic coefficient is designated with a predicted range of decentration occurring in the typical human eye during contact lens wear, whereby a contact lens having both good wear comfort and optimal optical characteristics may be realized more easily and advantageously.

A third embodiment of the present invention as it relates to a contact lens provides a contact lens having a refractive power ranging from −15.0 to +15.0 diopters in an optical zone thereof, wherein both a back surface and a front surface of the optical zone are curving surfaces described at least approximately by the following equation representing a conical surface:

$$Y = (C \cdot X^2) / (1 + \sqrt{(1 - (1 + K) \cdot C^2 \cdot X^2)})$$

where C is an inverse of a radius of curvature of the lens, Y is a distance along a direction of an optical axis from an origin of the lens, X is a distance in a radial direction from a lens origin, and K is a conic coefficient; and wherein a value of the conic coefficient K in the above equation at least approximating the front surface of the optical zone is 0.4 to 1.6 times a value of a conic coefficient K in the above equation at least approximating the back surface of the optical zone.

In the contact lens designed with a structure according to this mode of the invention, both good wear comfort and optimal required optical characteristics may be realized more easily and advantageously. The contact lens of this mode of the invention advantageously provides a good fit to the shape of the cornea of the typical human eye, since the value of the conic coefficient K in the above equation at least approximating the back surface of the optical zone is set within the range of −0.04 to −0.49, particularly.

A fourth mode of the present invention as it relates to a contact lens design method provides a contact lens design method for designing a contact lens having a refractive power ranging from −15.0 to +15.0 diopters in an optical zone thereof, comprising the steps of: (a) designing a back surface of the optical zone as a conical surface having a conic coefficient ranging from −0.04 to −0.49 in consideration of a shape of the corneal surface; and (b) designing a front surface of the optical zone as a conical surface such that a conic coefficient of the front surface is made to differ within a range of −0.02 to −0.50 so as to optimize optical characteristics of the contact lens in consideration of an optical system of an eye when the contact lens is located at a position of rest during wear in which an optical axis of the optical zone is decentered with respect to an optical axis of the eye.

According to the method of the present invention, there is provided a contact lens permitting a good wear comfort when worn on a cornea of an eye of a specific typical human wearer. In addition, the contact lens designed with the method of the present invention has optimal optical characteristics at the rest position of the lens on the cornea, since it is designed based on an estimate of lens decentration during wear taken into consideration. For this arrangement, the contact lens designed with the method of the present invention can provide consistently good vision when the lens is positioned at the rest position in which the lens optical axis is offset from the pupil centerline, or when an amount of decentration of the lens optical axis and the pupil centerline changes, as occurs with blinking, for example. Moreover, aberration in the visual field further away from the lens optical axis is reduced, making it possible to provide good vision close to normal human vision over an entire broad range of vision that includes the pupil centerline.

A fifth mode of the present invention as it relates to a design family of contact lenses provides a design family of contact lenses including a plurality of series of contact lens combinations each series containing an assorted plurality of contact lenses having mutually different refractive power features, and employing contact lenses according to the above-described first and second modes of the invention, wherein a decentration angle of the optical axis of the optical zone with respect to the optical axis of the eye with the lens located in the position of rest during wear is set to a plurality of different levels, and wherein for each of the plurality of levels of the decentration angle, contact lenses that are sorted by different front surface shapes for different levels of the decentration angle and that are imparted with a desired refractive power are combined as a series.

In series of contact lens combinations according to the present invention, contact lenses provided in numbers corresponding to some suitable distribution of lens optical power (for example, 0.25 diopter increments or 0.5 diopter increments) are designed for a plurality of different values for estimated decentration of the lens optical axis relative to the pupil centerline (decentration angle) during wear, by varying the front surface shape of the contact lenses for each level of decentration so as to give optimal optical characteristics, to provide series of a plurality of lens combinations. When selecting contact lenses for a specific wearer from these series of contact lens combinations, the position of rest of the lens when worn by the wearer (decentration angle of lens optical axis relative to pupil centerline) is calculated, and on the basis of this value, a contact lens series is selected, and the proper lens optical power required by the wearer is then chosen from the selected series, so as to select and provide a contact lens affording optimal vision to the particular wearer. In series of contact lens combinations according to the present invention, contact lenses sorted according to desired refractive power by imparting mutually different front surface shape with reference to the plurality of plurality of set levels of decentration angle will in preferred practice be additionally provided with a plurality of different back surface shapes in the optical portion, and sorted according to each of the different back surface shapes.

In series of contact lens combinations according to the present invention, preferably, the contact lenses sorted by different front surface shapes for different levels of the decentration angle in order to provide the desired refractive power, are additionally provided with a plurality of different back surface shapes in the optical zone, and sorted by the different back surface shapes.

The shape of the front surface of the contact lens that provides optimal vision, differs not only with the extent of decentration of the lens optical axis relative to the pupil centerline with the contact lens in the position of rest, but also with the shape of the lens back surface or a radius of curvature at the lens vertex in the optical zone, as determined on the basis of the shape of the cornea of the wearer. Therefore, it is possible by setting the shape of the lens back surface to a number of levels within a predicted range and by producing series of contact lens combinations for different levels of the shape of the lens back surface, to provide contact lenses capable of providing optimal vision while easily and satisfactory cooping with other types of factors that vary among individual wearers.

BRIEF DESCRIPTION OF THE DRAWINGS

The forgoing and/or other objects features and advantages of the preferred embodiment with reference to the accompanying drawings in which like reference numerals designate like elements and wherein.

DETAILED DESCRIPTION OF PREFERRED EMBODIMENTS

Figure 1:
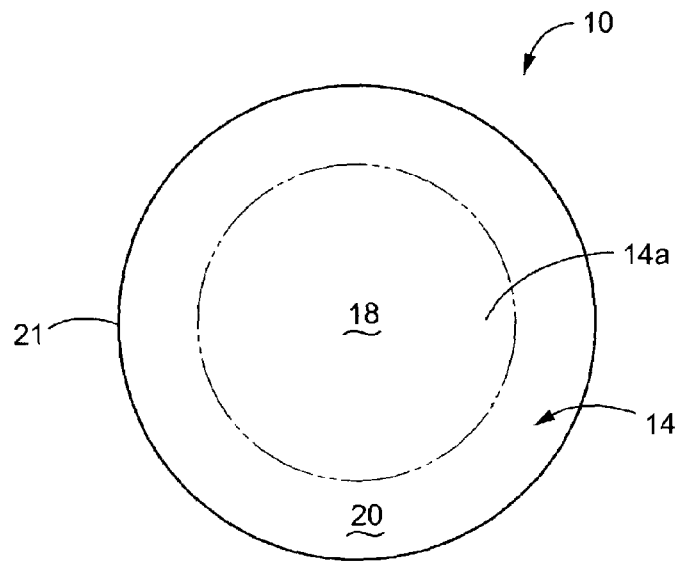
FIG. 1 is a front elevational view for schematically illustrating an entire structure of a contact lens constructed according to a first embodiment.
Figure 2:
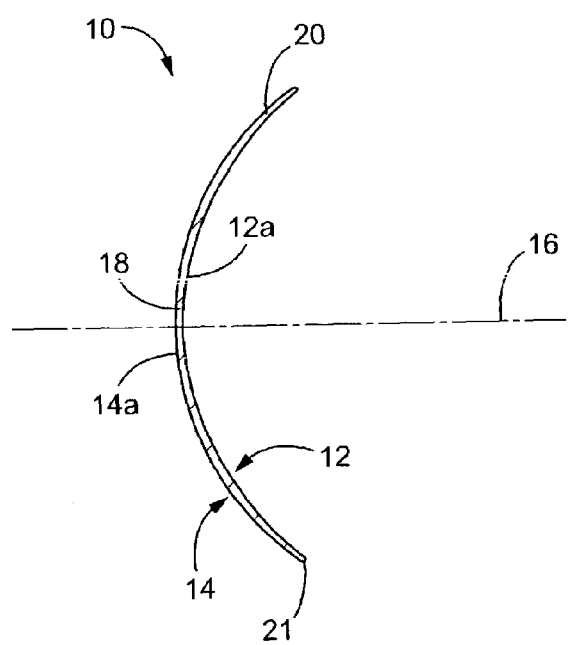
FIG. 2 is a vertical cross sectional view of the contact lens of FIG. 1.

FIGS. 1 and 2 show schematically a contact lens 10 designed with a structure constructed according to one embodiment of the present invention. The contact lens 10 includes: a back surface 12 generally having an approximately spherical concave shape, and a front surface 14 generally having an approximately spherical convex shape, and is generally of dome shape in its entirety. The central section of the contact lens 10 is an optical zone 18 that is circular viewed from the front, and is adapted to provide the user with a predetermined vision correction effect. The peripheral section of the contact lens 10 surrounding The optical zone 18 is a peripheral zone 20 in the form of an annular band viewed from the front, and is designed so that the contact lens 10 is held stably at a predetermined position on a wearer's cornea by means of the peripheral zone 20. The peripheral edge of the peripheral zone 20 constitutes an edge portion 21 connecting the back and front surfaces of the lens. In the present embodiment, the entire contact lens 10, including the optical zone 18 and the peripheral zone 20, optically and geometrically has a form of a solid of revolution generated by rotation about a lens center axis 16 as a geometric center axis of the contact lens 10.

In this contact lens 10, the back surface of the optical zone 18 (hereinafter referred to as the "back optical zone $12a$") and the front surface of the optical zone 18 (hereinafter referred to as a "front optical zone $14a$") are both defined by conical surfaces having the lens center axis 16 as their center axis. The conical surface of the back optical zone $12a$ has a specific conic coefficient Ka value designed to provide comfortable wear, while the conical surface of the front optical zone $14a$ has a specific conic coefficient Kb value designed to provide good vision through optimal optical characteristics during wear. "Conic coefficient" herein refers to a coefficient appearing in the commonly used equation for representing a conical surface, which is an aspherical surface. Once the conic coefficient has been selected, a conical surface generated by selecting the radius of curvature at a vertex (i.e., an intersection of the lens optical axis and lens surface) serving as a standard spherical surface can then be readily derived as a surface of revolution having the lens optical axis (the geometric center axis of the lens) as a object axis. Selection of the conic coefficients Ka, Kb which define the shapes of the back and front optical zones $12a$, $14a$ according to the invention will be described more specifically.

The conical surface shape of the back optical zone $12a$ is basically designed to conform to the surface shape of the wearer's cornea. Once the surface shape of the wearer's cornea has been determined, a method such as that disclosed in WO94/10599 for example can be used to calculate values for conic coefficient Ka and vertex radius of curvature ra for a spherical surface providing good wear comfort. Good wear comfort will be provided by a shape that avoids localized compression of the cornea in its center and peripheral areas during wear of the contact lens 10, and that provides appropriate movement over the cornea so as to permit proper tear fluid exchange through displacement to a suitable position on the cornea during blinking, or the like.

Considering the shape of the typical human eye, the conic coefficient Ka of the conical surface employed in the back optical zone $12a$ of the contact lens 10 is preferably selected to satisfy the following expression: $-0.04 \geq Ka \geq -0.49$. Similarly, considering the shape of the typical human eye, the value of the vertex radius of curvature ra for the back optical zone $12a$ is preferably selected to satisfy the following expression: $5.0 \text{ mm} \leq ra \leq 10.0 \text{ mm}$. The radius of curvature of the wearer's cornea may be determined on the basis of measurements made using known methods. In actual practice, prescription involves selecting several numerical values at suitable numerical value intervals within the numerical ranges given above, preparing contact lenses 10 having several types of back optical zone $12a$, and selecting from among these one that is most suitable for the particular wearer. In order to provide contact lenses 10 accommodating the greatest number of individuals with the fewest number of types of lens, the conic coefficient Ka of the back optical zone $12a$ will preferably be selected to meet the following expression: $-0.09 \geq Ka \geq -0.36$, and the vertex radius of curvature to meet the following expression: $6.0 \text{ mm} \leq ra \leq 9.0 \text{ mm}$. Examination of extensive data conducted by the present inventors has revealed that the back optical zone $12a$ having the conic coefficient Ka in the range of $-0.10 \geq Ka \geq -0.15$ is even more appropriate for the human eye.

The shape of the front optical zone $14a$ is designed relatively considering the shape of the back optical zone $12a$, so as to provide the wearer with optimal optical characteristics. Evaluation of optical characteristics considers not only the lens optical power required by the individual wearer, but also the optical system of the wearer's eyes.

The basis concept of evaluation and contact lens design in the present embodiment is illustrated schematically in FIG. 3 in comparison with the conventional approach. FIG. 3A shows a contact lens 32 obtained with one conventional design method in which the lens is designed on a lens unit basis, based on optical characteristics evaluated in the air without considering the optical system of the eye, as taught by Japanese Patent Nos. 2,859,092 and 2,913,191. As is apparent from the drawing, when placed under air, the contact lens 32 is free of aberration on the optical axis. However, research and experimentation conducted by the inventors has revealed that when the contact lens 32 is actually worn in a human eye 22 as shown in FIG. 3B, aberration is produced on the optical axis of the eye and the pupil centerline with the optical system of the eye taken into consideration in terms of the effects of the optical characteristics of a cornea 24, an aqueous humor 26, a crystalline lens 28, a vitreous body 30 of the eye 22, a tear fluid lens formed between the contact lens 32 and the cornea 24, and the like. Therefore, the contact lens 32 obtained with the conventional design method is incapable of providing optimal optical characteristics in actual practice.

Figure 3A:
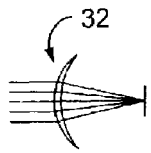
FIGS. 3A–3F are an explanatory view demonstrating the basis concept of designing the contact lens of the first embodiment in comparison with the conventional approach.
Figure 3B:
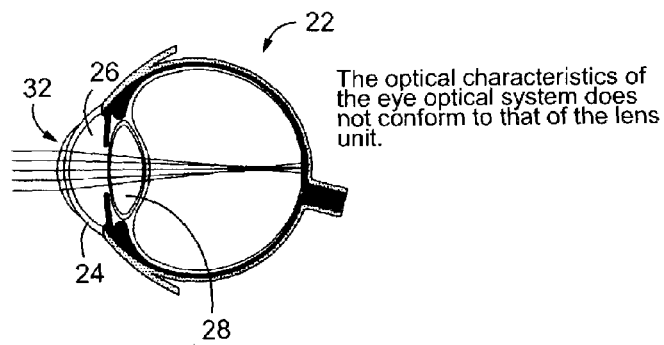
Figure 3C:
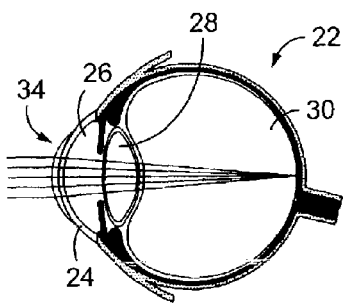

FIG. 3C shows a contact lens 34 obtained with another conventional design method in which the lens is designed based on optical characteristics considering the optical system of the eye, as taught in Japanese Patent No. 3,022,640. The design method is disclosed in the cited publication and redundant detail description of the method is omitted herein. As is apparent from FIG. 3C, the contact lens 34 provides aberration-free optical characteristics on the pupil centerline during lens wear. However, research and experimentation conducted by the inventors has revealed that when the contact lens 34 is actually worn on the cornea 24 shown in FIG. 3D, decentration of the pupil centerline with respect to the lens optical axis of the contact lens 34 is caused by displacement of the contact lens 34 on the cornea due to the effects of gravity and external force upon blinking, and eventually causes that the design intended to eliminate aberration on the lens optical axis actually exacerbates aberration on the pupil centerline, resulting in defective vision.

Figure 3E:
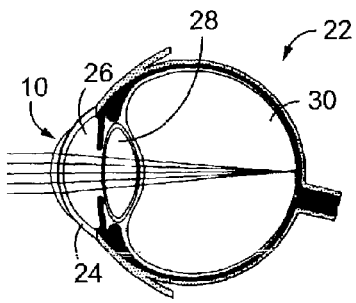
Figure 3D:
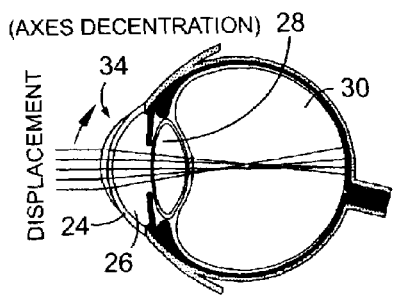
Figure 3F:
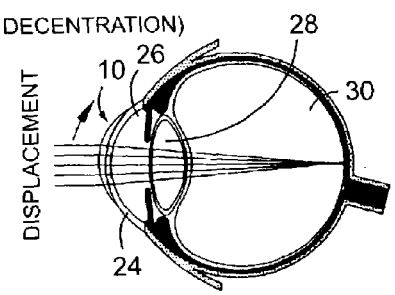

In contrast to contact lenses 32, 34 designed by conventional methods, the contact lens 10 of the present invention of a structure in accordance with the present invention employs a specific shape for the lens front surface optical zone 14a, and thus when worn in the human eye 22 as shown in FIG. 3E and FIG. 3F, its optical characteristics do not change appreciably when the contact lens 32 is displaced on the cornea 24, thereby providing stable good vision.

The shape of the front optical zone 14a providing good stable vision is determined by adopting a conical surface for the front optical zone 14a, selecting the conic coefficient Kb thereof within the range "$-0.02 \geq Kb \geq -0.50$", and calculating a shape that will provide optimal optical characteristics with the contact lens 10 positioned on the cornea at a location of rest decentered by a predetermined amount from the pupil centerline.

The determination as to whether or not a particular shape will provide optimal optical characteristics may be made using any of a number of optical characteristic evaluation methods, for example, interrelated wave aberration, numerical values from a PSF (Point Spread Function) or MTF (Modulation Transfer Function), or a numerical value for resolution may be used. "Wavefront aberration" refers to a difference between the real wavefront passing through an optical system and the ideal wavefront; "PSF" to a function representing the intensity distribution in the image plane of an image of a physical point in physical space produced by an optical system; "MTF" to a function representing change in contrast in an image of a sine wave pattern as a function of spatial frequency; and "resolution" to a quantity representing the power of a lens, specifically, the inverse of the minimum distance (in mm) between pairs of black and white bars distinguishable in an image. As all of these optical characteristic evaluation methods are known to those skilled in the art, and the specific calculations may be performed easily using commercially available software packages, it is suffice here simply to mention some exemplary software packages that can be used. Values for evaluating optical characteristics may be calculated using OSLO SIX by Sinclair Optics Inc., and ZEMAX by Focus Software Inc., for example.

The extent of decentration of the contact lens 10 on the cornea 24 is a prerequisite for calculating optical characteristics, and can be determined, for example, by calculating the position of rest of the contact lens based on the Gullstrand Schematic eye model mentioned above, other known eye model or modification thereof, or a newly calculated eye model. When designing a contact lens for an individual patient, the extent of decentration can be determined, for example, by estimating the position of rest of the contact lens during wear on the basis of measurement of the individual's corneal shape, condition of the eyelid, position of the pupil and the like, or by actual measurement of the specific position of rest of a suitable contact lens worn by the individual. Numerous measurements carried out by the present inventors have shown that in actual practice it is effective to design lens specifications on the assumption that the extent of decentration of the contact lens 10 during wear is within the range of 5 to 10° decentration angle of the lens optical axis from the pupil centerline, whereby contact lens suitable for a large number of wearers can be provided with a relatively small number of lens specifications.

As is apparent from the aforesaid description, the contact lens 10 whose lens front surface optical zone 14a is the conical surface having the conic coefficient Kb of $-0.02 \geq Kb \geq -0.50$, and whose optical characteristics have been designed such that optimal optical characteristics are achieved at the position of rest of the lens, is capable of consistently providing the wearer with clear, substantially unchanging vision when the contact lens 10 is positioned at the position of rest on the cornea 24 during wear, or when the extent of decentration of the pupil centerline with respect to the lens optical axis of the optical zone 18 changes during displacement of the lens on the cornea 24, thereby providing good vision with overall aberration held to within practicable levels.

Accordingly it will be understood that "optimal optical characteristics" herein refers to best optical characteristics achievable within the selectable range of combinations for conical surface shape of the selected back optical zone 12a and conical surface shape of the selectively employed front optical zone 14a, and does not necessarily refer to the best optical characteristics achievable under any and all circumstances. In actual practice, prescription involves selecting several numerical values at suitable numerical value intervals within the numerical ranges given above, preparing contact lenses having several types of front optical zone 14a, and selecting from among these one that is most suitable for the particular wearer. In order to provide contact lenses 10 accommodating the greatest number of individuals with the fewest number of types of lens, more particularly, a plurality of levels at suitable intervals within the range of 5 to 10° are pre-established for the intersect angle of the lens optical axis and pupil centerline (decentration angle) with the lens at the position of rest during wear, and for each of levels there are predetermined, with reference to the lens optical power (refractive power) of the lens used, a plurality of levels of conic coefficient Kb for front optical zone 14a giving optimal optical characteristics, from among which a suitable level is selected to provide a contact lens fulfilling these values.

The back and front optical zones 12a, 14a of the contact lens 10 of the present embodiment determined in the above-described manner is generally arranged to have the conic coefficient Kb of the front optical zone 14a that is equivalent to 0.4 to 1.6 times the conic coefficient Ka of the lens back surface optical zone 12a.

The contact lens 10 having its back and front optical zones 12a, 14a shape determined in the manner described previously is ultimately provided to the wearer using conventional methods, by selecting the overall outside diameter (DIA), a thickness at the lens center axis (CT), an area ratio of the optical zone 18 to the entire lens, and other parameters, while taking into consideration the morphology and dimensions of the wearer's eye and eyelid, required lens optical power, the material of the contact lens and the like. The contact lens 10 may be formed of various soft type or hard type materials using conventional known contact lens fabrication techniques such as molding, cutting, or spin casting. However, it should be understood that while the contact lens 10 product as-produced in this manner will not always precisely meet the design values, if the shape is close enough, it will nevertheless provide good vision to the wearer provided that it has the intended optical characteristics.

Specifically, the lens back and front optical zones 12a, 14a of the contact lens 10 provided to the wearer in actual practice is a surface of revolution about the lens center axis that can be represented at least approximately by Equation (1) which represents a conical surface.

$$Y = (C \cdot X^2) / (1 + \sqrt{(1 - (1+K) \cdot C^2 \cdot X^2)}) \qquad (1)$$

In Equation (1), C is the inverse of the radium of curvature of the lens, Y is the distance along the direction of the optical axis from the origin of the lens, X is the distance in the radial direction from the origin on the lens optical axis, and K is the conic coefficient of the back optical zone 12a(Ka) or the conic coefficient of the front optical zone 14a(Kb).

Contact lenses 10 having the structure described above may be effectively provided as a design family in which these contact lenses 10 are assorted in series so that suitable lenses can be quickly provided to anticipated wearers.

In this regard, assuming the contact lenses 10 have the same shape in their back optical zones 12a, shapes of the front optical zones 14a have different values of conic coefficient Kb for affording the best optical characteristics for a particular decentration angle of the pupil centerline and lens optical axis with the lenses 10 at their position of the rest during wear. Therefore, products having front optical zone 14a shapes affording the best optical characteristics at decentration angles determined for a plurality of levels anticipated to be required may be preferably provided in the form of series of design-family contact lenses, which series contain combinations of contact lenses in numbers corresponding to an established number of levels of lens optical power (refractive power) anticipated to be required.

As the shape of the front optical zone 14a may also have different conic coefficient Kb value affording the best optical characteristics depending on the shape of the back optical zone 12a, it is still more preferable to provide series of combinations of contact lenses classified according to each of a plurality of levels of lens back surface optical zone 12a conic coefficient Ka values anticipated to be required.

A specific example of the contact lens having the structure according to the present invention was actually fabricated and studied by the present inventors. Data for the specific example is presented below. It should be appreciated that the present invention is not particularly limited to the details of the illustrated embodiment and following description of Example of the invention. It is also to be understood that the present invention may be embodied with various other changes, modifications and improvements, which may occur to those skilled in the art, without departing from the spirit and scope of the invention.

EXAMPLE

For hard contact lenses of gas permeable polymethyl methacrylate (PMMA), optical simulations were used to arrive at conic coefficients for the front optical zone 14a that would afford optimal optical characteristics under conditions of wear producing predetermined decentration, assuming the back optical zone 12a to be a spherical convex surface consisting of a spherical surface with a conic coefficient Ka of −0.1225. The simulations in this example were run setting the back optical zone 12a vertex radius of curvature ra to ra=6.0 mm and r=9.0 mm. For lens decentration during wear, optical simulations were run on the assumption that the intersect angle φ of the lens optical axis and pupil centerline was φ=0°, 5° and 10°, determining in each case conic coefficient Kb of the front optical zone 14a, which provides the best optical system.

For the optical simulations, the Gullstrand model of the eye was used as the optical system of the eye for hypothesizing physical shape, using the standard parameters of the model. Calculations were performed on a microcomputer using ZEMAX Ver. 9.0 by Focus Software Inc.

Figure 4:
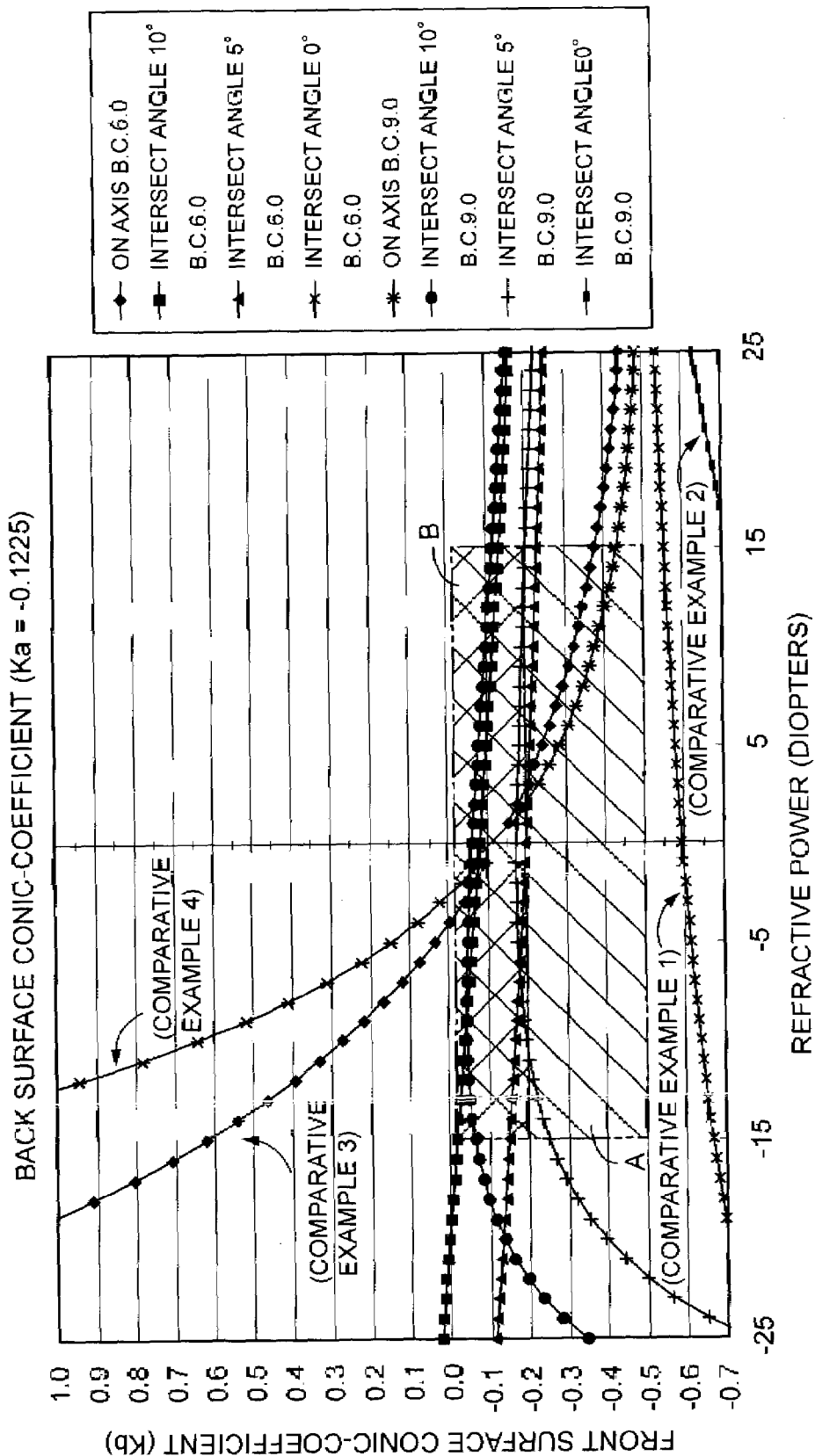
FIG. 4 is a graph demonstrating features of lens surfaces of contact lenses according to examples of the present invention, together with those of comparative examples.

For purposes of comparison, the graph of FIG. 4 also shows conic coefficient Kb values of the front optical zone 14a for Comparative Examples 1 and 2, in which the lens shape of the front optical zone 14a was designed under the constraint of a given lens back surface optical zone 12a similar to that in the Example, but without considering decentration of the lens optical axis and pupil centerline during wear, instead designing the shape so as to afford optimal optical characteristics on the lens optical axis. For purposes of comparison, the graph of FIG. 4 also shows conic coefficient Kb values of the front optical zone 14a for Comparative Examples 3 and 4, in which the shape of the front optical zone 14a was designed under the constraint of a given lens back surface optical zone 12a similar to that in the Example, but using a hypothetical lens unit in the atmosphere and conferring optimal aberration-free optical characteristics on the lens optical axis.

As is apparent from the graph of FIG. 4 it will be apparent that a contact lens affording optimal optical characteristics during wear is advantageously provided in Zone A, and preferably Zone B, which zones fulfill the design parameters of the present invention. It will further be apparent, particularly from differences with Comparative Examples 3 and 4, that lens design based on a hypothetical lens unit does not realistically afford effective optical characteristics, at least in contact lenses of which correction (power) will be required under conditions of wear.

Figure 5A:
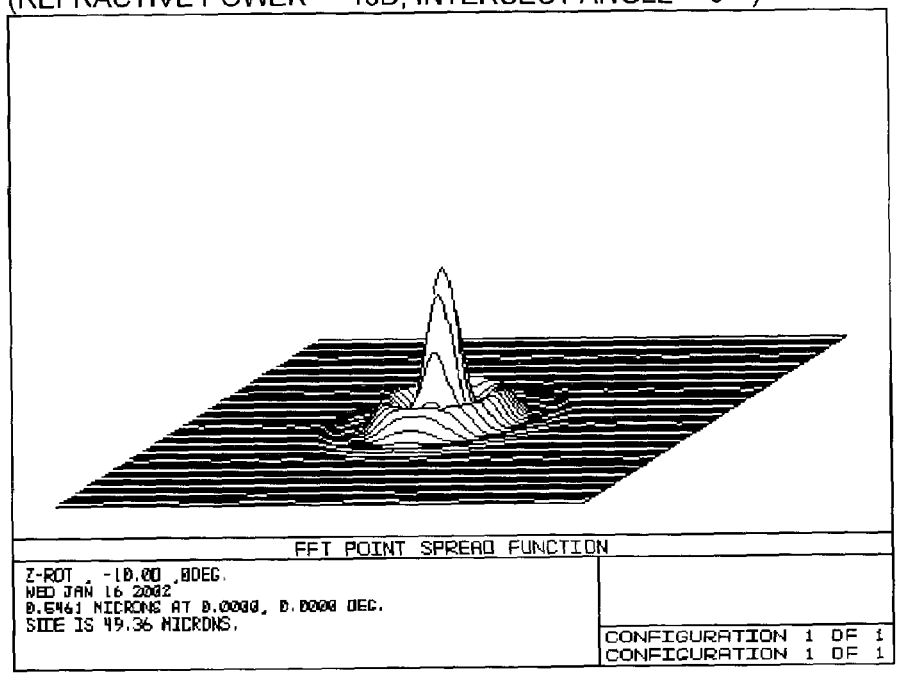
FIGS. 5A and 5B are views in which optical characteristics of a contact lens according to an example of the present invention are evaluated in values as a result of PSF calculation.
Figure 5B:
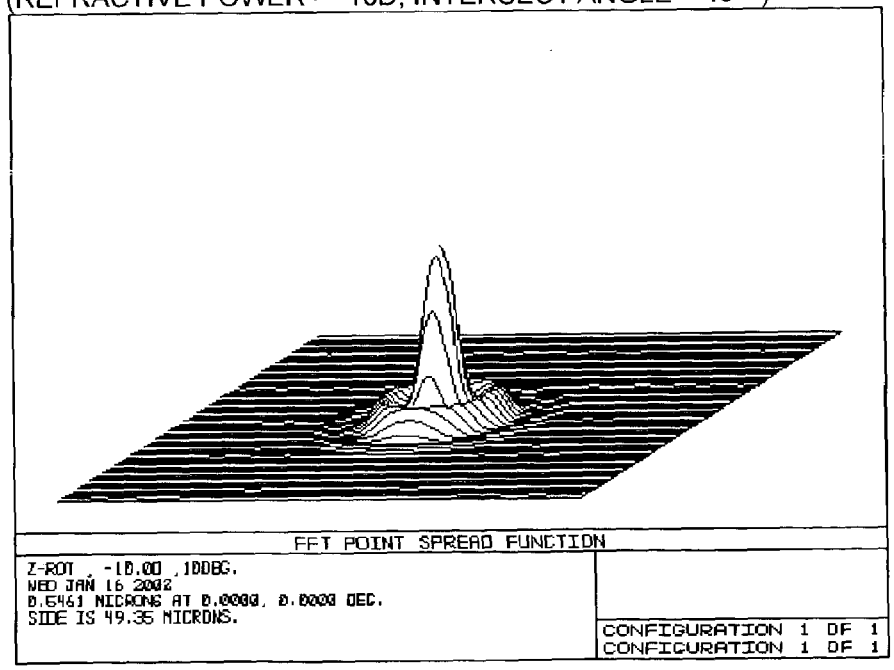

The contact lenses were evaluated in terms of sharpness of vision under conditions of actual wear and stability of vision when lens-position on the cornea changes on the basis of lens shape values derived according to the design method described above in the following manner. The contact lens having refractive power of −10 diopters, which is designed so that optical characteristics are optimized under conditions of a 10° decentration angle of the pupil centerline with respect to the lens optical axis at the position of rest, was displaced on the cornea while calculating PSF for 0° and 10° decentration angles of the pupil centerline with respect to the lens optical axis. The results of this calculation are shown in FIGS. 5A and 5B. As is apparent from results given in the drawings, the contact lens having a structure in accordance with the present invention affords approximately equal and satisfactory PSF values, as an indicator of quality of vision (sharpness) under conditions of both 0° and 10° decentration angles of the pupil centerline with respect to the lens optical axis.

Figure 6A:
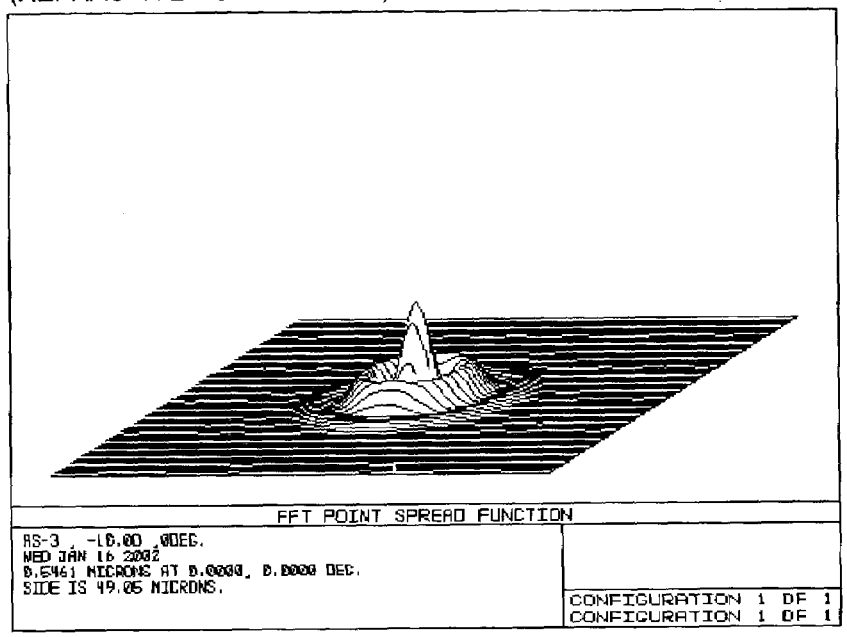
FIGS. 6A and 6B are views corresponding to FIGS. 5A and 5B, in which optical characteristics of a contact lens according to a comparative example are evaluated in values as a result of PSF calculation.
Figure 6B:
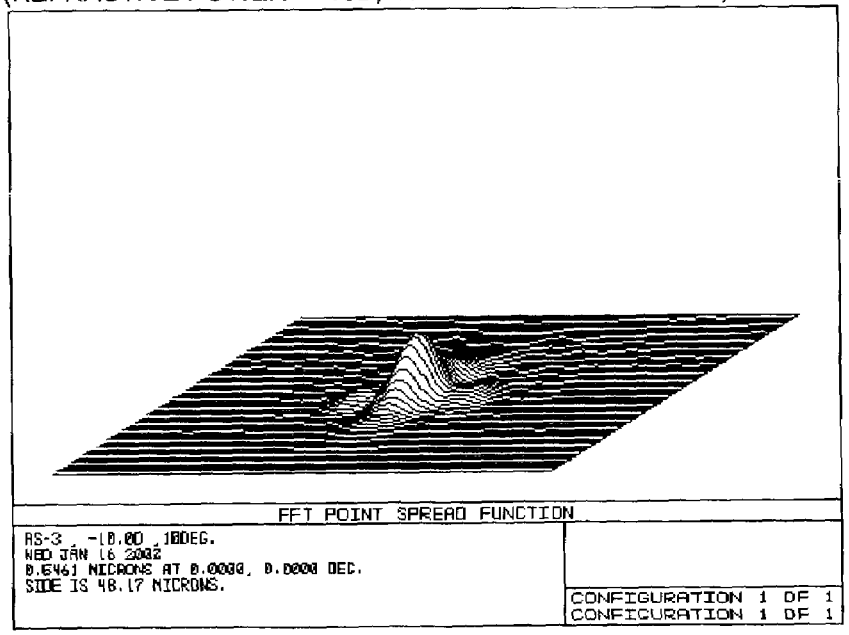

The comparative example 3 of the contact lens having −10 diopters, like in the Example, was designed on the lens unit basis without considering the optical system of the eye and with the best optical characteristics produced on the optical axis, and was subjected to optical simulations during wear under the same conditions as the Example, for calculating PSF for 0° and 10° decentration angles of the pupil centerline with respect to the lens optical axis. The results of this calculation are shown in FIGS. 6A and 6B. As is apparent from results given in the drawings, eccentricity of the lens optical axis with respect to the pupil centerline causes a sharp drop in PSF value, and it is surmised that vision lens on the cornea.

While a detailed description will not be made herein, we fabricated contact lenses designed in accordance with the invention so as to afford required optical characteristics at rest in a position with the pupil centerline decentered from the lens optical axis, and provided these for wear by several test subjects in a clinical test. The results of the test supported the results of the simulations conducted in the Example and Comparative Examples.

What is claimed is:

1. A contact lens made of a single material, wherein improvements comprising that a front and a back surface are created as aspherical surfaces, said contact lens has a refractive power ranging from −15.0 to +15.0 diopters in an optical zone thereof, and a back surface of said optical zone is a conical surface having a conic coefficient ranging from −0.04 to −0.49, and a front surface of said optical zone is a conical surface having a conic coefficient ranging from −0.02 to −-0.50 so that said contact lens provides optical characteristics determined in consideration of an optical system of an eye when being located at a position of rest during wear in which an optical axis of said optical zone is decentered wit respect to an optical axis of said eye.

2. A contact lens according to claim 1, wherein said back surface of said optical zone is a conical surface having a conic coefficient ranging from −0.09 to −0.36.

3. A contact lens according to claim 1, wherein said back surface of said optical zone is a conical surface having a conic coefficient ranging from −0.10 to −0.15.

4. A contact lens according to claim 1, wherein said conical surface on said front surface of said optical zone has a conic coefficient that is 0.4 to 1.6 times said conic coefficient of the conical surface on the back surface of the optical zone.

5. A contact lens having a refractive power ranging from −15.0 to +15.0 diopters in an optical zone thereof wherein a back surface of said optical zone is a conical surface having a conic coefficient ranging from −0.04 to −0.49, and a front surface of said optical zone is a conical surface having a conic coefficient ranging from −0.04 to −0.20 so that said contact lens provides optical characteristics required in consideration of an optical system of an eye when being located at a position of rest during wear in which an optical axis of said optical zone is decentered by 5 to 10° with respect to an optical axis of said eye.

6. A contact lens design method for designing a contact lens having a refractive power ranging from −15.0 to +15.0 diopters in an optical zone thereof, comprising the steps of:
designing a back surface of said optical zone as a conical surface having a conic coefficient ranging from −0.04 to −0.49 in consideration of a shape of the corneal surface; and
designing a front surface of said optical zone as a conical surface such that a conic coefficient of said front surface is made to differ within a range of −0.02 to −0.50 so as to optimize optical characteristics of said contact lens in consideration of an optical system of an eye when said contact lens is located at a position of rest during wear in which an optical axis of said optical zone is decentered with respect to an optical axis of said eye.

7. A design family of contact lenses including a plurality of series of contact lens combinations each series containing an assorted plurality of contact lenses having mutually different refractive power features, and employing contact leases each having a refractive power ranging from −15.0 to +15.0 diopters in an optical zone thereof, wherein a back surface of said optical zone is a conical surface having a conic coefficient ranging from −0.04 to −0.49, and a front surface of said optical zone is a conical surface having a conic coefficient ranging from −0.02 to −0.50 so that said contact lens provides optical characteristics required in consideration of an optical system of an eye when being located at a position of rest during wear in which an optical axis of said optical zone is decentered with respect to an optical axis of said eye, wherein a decentration angle of said optical axis of said optical zone with respect to said optical axis of said eye with the lens located in said position of rest during wear is set to a plurality of different levels, and wherein for each of said plurality of levels of said decentration angle, contact lenses that are sorted by different front surface shapes for different levels of said decentration angle and that arc imparted with a desired refractive power are combined as a series.

8. A design family of contact lenses according to claim 7, wherein said contact lenses sorted by different front surface shapes for different levels of said decentration angle in order to provide said desired refractive power, are additionally provided with a plurality of different back surface shapes in said optical zone, and sorted by said different back surface shapes.

* * * * *